(12) United States Patent
Fudemoto et al.

(10) Patent No.: US 7,579,398 B2
(45) Date of Patent: *Aug. 25, 2009

(54) NANO-COMPOSITE AND COMPOSITIONS THEREFROM

(75) Inventors: Hiroyuki Fudemoto, Kodaira (JP); Xiaorong Wang, Hudson, OH (US)

(73) Assignee: Bridgestone Corporation, Kodaira-Shi, Tokyo (JP)

( * ) Notice: Subject to any disclaimer, the term of this patent is extended or adjusted under 35 U.S.C. 154(b) by 511 days.

This patent is subject to a terminal disclaimer.

(21) Appl. No.: 11/344,861

(22) Filed: Feb. 1, 2006

(65) Prior Publication Data

US 2009/0182087 A1  Jul. 16, 2009

Related U.S. Application Data

(60) Provisional application No. 60/649,420, filed on Feb. 2, 2005.

(51) Int. Cl.
*C08K 5/00* (2006.01)
(52) U.S. Cl. .................. 524/445; 524/186; 524/447
(58) Field of Classification Search .............. 524/445, 524/447, 186
See application file for complete search history.

(56) References Cited

U.S. PATENT DOCUMENTS

| | | | |
|---|---|---|---|
| 2,493,318 A | 1/1950 | Shonle et al. |
| 2,531,396 A | 11/1950 | Carter et al. |
| 3,598,884 A | 8/1971 | Wei et al. |
| 3,793,402 A | 2/1974 | Owens |
| 3,840,620 A | 10/1974 | Gallagher |
| 3,972,963 A | 8/1976 | Schwab et al. |
| 4,233,409 A | 11/1980 | Bulkley |
| 4,247,434 A | 1/1981 | Vanderhoff et al. |
| 4,326,008 A | 4/1982 | Rembaum |
| 4,386,125 A | 5/1983 | Shiraki et al. |
| 4,463,129 A | 7/1984 | Shinada et al. |
| 4,543,403 A | 9/1985 | Isayama et al. |
| 4,598,105 A | 7/1986 | Weber et al. |
| 4,602,052 A | 7/1986 | Weber et al. |
| 4,659,790 A | 4/1987 | Shimozato et al. |
| 4,665,963 A | 5/1987 | Timar et al. |
| 4,717,655 A | 1/1988 | Fulwyler |
| 4,725,522 A | 2/1988 | Breton et al. |
| 4,764,572 A | 8/1988 | Bean, Jr. |
| 4,773,521 A | 9/1988 | Chen |
| 4,774,189 A | 9/1988 | Schwartz |
| 4,788,254 A | 11/1988 | Kawakubo et al. |
| 4,829,130 A | 5/1989 | Licchelli et al. |
| 4,829,135 A | 5/1989 | Gunesin et al. |
| 4,837,274 A | 6/1989 | Kawakubo et al. |
| 4,837,401 A | 6/1989 | Hirose et al. |
| 4,861,131 A | 8/1989 | Bois et al. |
| 4,870,144 A | 9/1989 | Noda et al. |
| 4,871,814 A | 10/1989 | Gunesin et al. |
| 4,904,730 A | 2/1990 | Moore et al. |
| 4,904,732 A | 2/1990 | Iwahara et al. |
| 4,906,695 A | 3/1990 | Blizzard et al. |
| 4,920,160 A | 4/1990 | Chip et al. |
| 4,942,209 A | 7/1990 | Gunesin |
| 5,036,138 A | 7/1991 | Stamhuis et al. |
| 5,066,729 A | 11/1991 | Srayer, Jr. et al. |
| 5,073,498 A | 12/1991 | Schwartz et al. |
| 5,075,377 A | 12/1991 | Kawakubo et al. |
| 5,100,947 A | 3/1992 | Puydak et al. |
| 5,120,379 A | 6/1992 | Noda et al. |
| 5,130,377 A | 7/1992 | Trepka et al. |
| 5,162,445 A | 11/1992 | Powers et al. |
| 5,169,914 A | 12/1992 | Kaszas et al. |
| 5,178,702 A | 1/1993 | Frerking, Jr. et al. |
| 5,194,300 A | 3/1993 | Cheung |
| 5,219,945 A | 6/1993 | Dicker et al. |
| 5,227,419 A | 7/1993 | Moczygemba et al. |
| 5,237,015 A | 8/1993 | Urban |
| 5,241,008 A | 8/1993 | Hall |
| 5,247,021 A | 9/1993 | Fujisawa et al. |
| 5,256,736 A | 10/1993 | Trepka et al. |
| 5,262,502 A | 11/1993 | Fujisawa et al. |
| 5,290,873 A | 3/1994 | Noda et al. |
| 5,290,875 A | 3/1994 | Moczygemba et al. |

(Continued)

FOREIGN PATENT DOCUMENTS

DE  3434983  4/1986

(Continued)

OTHER PUBLICATIONS

Ishizu, Koji et al., "Core-Shell Type Polymer Microspheres Prepared by Domain Fixing of Block Copolymer Films", Journal of Polymer Science: Part A: Polymer Chemistry, vol. 27, pp. 3721-3731 (1989).
Ishizu, Koji et al., "Preparation of core-shell type polymer microspheres from anionic block copolymers", Polymer, vol. 34, No. 18, pp. 3929-3933 (1993).
Saito, Reiko et al., "Core-Shell Type Polymer Microsphreres Prepared From Poly(Styrene-b-Methacrylic Acid)—1. Synthesis of Microgel", Eur. Polym. J., vol. 27, No. 10, pp. 1153-1159 (1991).
Saito, Reiko et al., "Arm-number effect of core-shell type polymer microsphere: 1. Control of arm-number of microsphere", Polymer, vol. 35, No. 4, pp. 866-871 (1994).

(Continued)

*Primary Examiner*—Katarzyna Wyrozebski
(74) *Attorney, Agent, or Firm*—Nathan T. Lewis; Meredith E. Hooker

(57) ABSTRACT

The present invention relates to various nano-composites and compositions comprising a cationic mediator and method thereof. The cationic mediator comprises a polymeric group and a cationic unit selected from the group consisting of onium cation and heterocyclic cation. The nano-composites and compositions exhibit improved gas permeability property, strong moisture absorbance, and high electrical conductivity etc.

20 Claims, 1 Drawing Sheet

U.S. PATENT DOCUMENTS

| | | | |
|---|---|---|---|
| 5,290,878 A | 3/1994 | Yamamoto et al. |
| 5,331,035 A | 7/1994 | Hall |
| 5,336,712 A | 8/1994 | Austgen, Jr. et al. |
| 5,362,794 A | 11/1994 | Inui et al. |
| 5,395,891 A | 3/1995 | Obrecht et al. |
| 5,395,902 A | 3/1995 | Hall |
| 5,399,628 A | 3/1995 | Moczygemba et al. |
| 5,399,629 A | 3/1995 | Coolbaugh et al. |
| 5,405,903 A | 4/1995 | Van Westrenen et al. |
| 5,421,866 A | 6/1995 | Stark-Kasley et al. |
| 5,436,298 A | 7/1995 | Moczygemba et al. |
| 5,438,103 A | 8/1995 | DePorter et al. |
| 5,447,990 A | 9/1995 | Noda et al. |
| 5,462,994 A | 10/1995 | Lo et al. |
| 5,514,734 A | 5/1996 | Maxfield et al. |
| 5,514,753 A | 5/1996 | Ozawa et al. |
| 5,521,309 A | 5/1996 | Antkowiak et al. |
| 5,525,639 A | 6/1996 | Keneko et al. |
| 5,527,870 A | 6/1996 | Maeda et al. |
| 5,530,052 A | 6/1996 | Takekoshi et al. |
| 5,576,372 A | 11/1996 | Kresge et al. |
| 5,576,373 A | 11/1996 | Kresge et al. |
| 5,580,925 A | 12/1996 | Iwahara et al. |
| 5,587,423 A | 12/1996 | Brandstetter et al. |
| 5,594,072 A | 1/1997 | Handlin, Jr. et al. |
| 5,614,579 A | 3/1997 | Roggeman et al. |
| 5,627,252 A | 5/1997 | De La Croi Habimana |
| 5,665,183 A | 9/1997 | Kresge et al. |
| 5,688,856 A | 11/1997 | Austgen, Jr. et al. |
| 5,707,439 A | 1/1998 | Takekoshi et al. |
| 5,728,791 A | 3/1998 | Tamai et al. |
| 5,733,975 A | 3/1998 | Aoyama et al. |
| 5,739,267 A | 4/1998 | Fujisawa et al. |
| 5,742,118 A | 4/1998 | Endo et al. |
| 5,763,551 A | 6/1998 | Wunsch et al. |
| 5,773,521 A | 6/1998 | Hoxmeier et al. |
| 5,777,037 A | 7/1998 | Yamanaka et al. |
| 5,807,629 A | 9/1998 | Elspass et al. |
| 5,811,501 A | 9/1998 | Chiba et al. |
| 5,834,563 A | 11/1998 | Kimura et al. |
| 5,847,054 A | 12/1998 | McKee et al. |
| 5,849,847 A | 12/1998 | Quirk |
| 5,855,972 A | 1/1999 | Kaeding |
| 5,883,173 A | 3/1999 | Elspass et al. |
| 5,891,947 A | 4/1999 | Hall et al. |
| 5,905,116 A | 5/1999 | Wang et al. |
| 5,910,530 A | 6/1999 | Wang et al. |
| 5,936,023 A | 8/1999 | Kato et al. |
| 5,955,537 A | 9/1999 | Steininger et al. |
| 5,986,010 A | 11/1999 | Clites et al. |
| 5,994,468 A | 11/1999 | Wang et al. |
| 6,011,116 A | 1/2000 | Aoyama et al. |
| 6,013,699 A | 1/2000 | Freeman et al. |
| 6,020,446 A | 2/2000 | Okamoto et al. |
| 6,025,416 A | 2/2000 | Proebster et al. |
| 6,025,445 A | 2/2000 | Chiba et al. |
| 6,034,164 A | 3/2000 | Elspass et al. |
| 6,060,549 A | 5/2000 | Li et al. |
| 6,060,559 A | 5/2000 | Feng et al. |
| 6,087,016 A | 7/2000 | Feeney et al. |
| 6,087,456 A | 7/2000 | Sakaguchi et al. |
| 6,106,953 A | 8/2000 | Zimmermann et al. |
| 6,117,932 A | 9/2000 | Hasegawa et al. |
| 6,121,379 A | 9/2000 | Yamanaka et al. |
| 6,127,488 A | 10/2000 | Obrecht et al. |
| 6,147,151 A | 11/2000 | Fukumoto et al. |
| 6,180,693 B1 | 1/2001 | Tang et al. |
| 6,191,217 B1 | 2/2001 | Wang et al. |
| 6,197,849 B1* | 3/2001 | Zilg et al. ............... 523/216 |
| 6,204,354 B1 | 3/2001 | Wang et al. |
| 6,225,394 B1 | 5/2001 | Lan et al. |
| 6,255,372 B1 | 7/2001 | Lin et al. |
| 6,268,451 B1 | 7/2001 | Faust et al. |
| 6,277,304 B1 | 8/2001 | Wei et al. |
| 6,348,546 B2 | 2/2002 | Hiiro et al. |
| 6,359,075 B1 | 3/2002 | Wollum et al. |
| 6,379,791 B1 | 4/2002 | Cernohous et al. |
| 6,383,500 B1 | 5/2002 | Wooley et al. |
| 6,395,829 B1 | 5/2002 | Miyamoto et al. |
| 6,420,486 B1 | 7/2002 | DePorter et al. |
| 6,437,050 B1 | 8/2002 | Krom et al. |
| 6,441,090 B1 | 8/2002 | Demirors et al. |
| 6,448,353 B1 | 9/2002 | Nelson et al. |
| 6,472,460 B1 | 10/2002 | Okamoto et al. |
| 6,486,253 B1 | 11/2002 | Gilmer et al. |
| 6,489,378 B1 | 12/2002 | Sosa et al. |
| 6,524,595 B1 | 2/2003 | Perrier et al. |
| 6,573,330 B1 | 6/2003 | Fujikake et al. |
| 6,598,645 B1 | 7/2003 | Larson |
| 6,612,351 B1 | 9/2003 | Zanzig |
| 6,617,020 B2 | 9/2003 | Zhou et al. |
| 6,649,702 B1 | 11/2003 | Rapoport et al. |
| 6,689,469 B2 | 2/2004 | Wang et al. |
| 6,693,746 B1 | 2/2004 | Nakamura et al. |
| 6,706,804 B2 | 3/2004 | Resendes |
| 6,706,813 B2 | 3/2004 | Chiba et al. |
| 6,706,823 B2 | 3/2004 | Wang et al. |
| 6,727,311 B2 | 4/2004 | Ajbani et al. |
| 6,737,486 B2 | 5/2004 | Wang |
| 6,750,297 B2 | 6/2004 | Yeu et al. |
| 6,759,464 B2 | 7/2004 | Ajbani et al. |
| 6,774,185 B2 | 8/2004 | Lin et al. |
| 6,777,500 B2 | 8/2004 | Lean et al. |
| 6,780,937 B2 | 8/2004 | Castner |
| 6,818,693 B2 | 11/2004 | Heinrich et al. |
| 6,835,781 B2 | 12/2004 | Kondou et al. |
| 6,849,680 B2 | 2/2005 | Knudson, Jr. et al. |
| 6,858,665 B2 | 2/2005 | Larson |
| 6,861,462 B2 | 3/2005 | Parker et al. |
| 6,872,785 B2 | 3/2005 | Wang et al. |
| 6,875,818 B2 | 4/2005 | Wang |
| 6,908,958 B2 | 6/2005 | Maruyama et al. |
| 6,956,084 B2 | 10/2005 | Wang et al. |
| 7,019,063 B2 | 3/2006 | Wada et al. |
| 7,071,246 B2 | 7/2006 | Xie et al. |
| 7,112,369 B2 | 9/2006 | Wang et al. |
| 7,179,864 B2 | 2/2007 | Wang |
| 7,205,370 B2 | 4/2007 | Wang et al. |
| 7,217,775 B2 | 5/2007 | Castner |
| 7,238,751 B2 | 7/2007 | Wang et al. |
| 7,241,829 B2* | 7/2007 | Chung et al. ............... 524/445 |
| 7,371,793 B2* | 5/2008 | Gong et al. ............... 524/445 |
| 2001/0053813 A1 | 12/2001 | Konno et al. |
| 2002/0007011 A1 | 1/2002 | Konno et al. |
| 2002/0045714 A1 | 4/2002 | Tomalia et al. |
| 2002/0095008 A1 | 7/2002 | Heimrich et al. |
| 2002/0144401 A1 | 10/2002 | Nogueroles Vines et al. |
| 2003/0004250 A1 | 1/2003 | Ajbani et al. |
| 2003/0032710 A1 | 2/2003 | Larson |
| 2003/0124353 A1 | 7/2003 | Wang et al. |
| 2003/0130401 A1 | 7/2003 | Lin et al. |
| 2003/0149185 A1 | 8/2003 | Wang et al. |
| 2003/0198810 A1 | 10/2003 | Wang et al. |
| 2003/0225190 A1 | 12/2003 | Borbely et al. |
| 2004/0033345 A1 | 2/2004 | Dubertret et al. |
| 2004/0059057 A1 | 3/2004 | Swisher et al. |
| 2004/0127603 A1 | 7/2004 | Lean et al. |
| 2004/0143064 A1 | 7/2004 | Wang |
| 2004/0147639 A1 | 7/2004 | Tsou et al. |
| 2004/0198917 A1 | 10/2004 | Castner |
| 2004/0226643 A1 | 11/2004 | Yagi et al. |
| 2004/0249045 A1 | 12/2004 | Goodman et al. |
| 2005/0027057 A1 | 2/2005 | Dias et al. |
| 2005/0027062 A1 | 2/2005 | Waddell et al. |

| | | | |
|---|---|---|---|
| 2005/0098252 A1 | 5/2005 | Muraoka et al. | |
| 2005/0101743 A1 | 5/2005 | Stacy et al. | |
| 2005/0137288 A1* | 6/2005 | Maruo et al. | 523/216 |
| 2005/0182158 A1 | 8/2005 | Ziser et al. | |
| 2005/0192408 A1 | 9/2005 | Wang et al. | |
| 2005/0197462 A1 | 9/2005 | Wang et al. | |
| 2005/0203248 A1 | 9/2005 | Zheng et al. | |
| 2005/0215693 A1 | 9/2005 | Wang et al. | |
| 2005/0222335 A1 | 10/2005 | Jones et al. | |
| 2005/0228074 A1 | 10/2005 | Wang et al. | |
| 2005/0277723 A1 | 12/2005 | Gong et al. | |
| 2005/0282956 A1 | 12/2005 | Bohm et al. | |
| 2006/0047054 A1* | 3/2006 | Wang et al. | 524/495 |
| 2006/0084722 A1 | 4/2006 | Lin et al. | |
| 2006/0100339 A1* | 5/2006 | Gong et al. | 524/445 |
| 2006/0173115 A1 | 8/2006 | Wang et al. | |
| 2006/0173130 A1 | 8/2006 | Wang et al. | |
| 2006/0205916 A1 | 9/2006 | Takekoshi et al. | |
| 2006/0235128 A1* | 10/2006 | Wang et al. | 524/445 |
| 2007/0015853 A1 | 1/2007 | Weng et al. | |
| 2007/0129477 A1 | 6/2007 | Weng et al. | |
| 2007/0135579 A1 | 6/2007 | Obrecht et al. | |
| 2007/0142550 A1 | 6/2007 | Wang et al. | |
| 2007/0142559 A1 | 6/2007 | Wang et al. | |
| 2007/0149649 A1 | 6/2007 | Wang et al. | |
| 2007/0161734 A1 | 7/2007 | Fudemoto et al. | |
| 2007/0161754 A1 | 7/2007 | Wang et al. | |
| 2007/0185273 A1 | 8/2007 | Wang et al. | |
| 2007/0196653 A1 | 8/2007 | Hall et al. | |
| 2007/0238822 A1 | 10/2007 | Wang et al. | |
| 2007/0293684 A1 | 12/2007 | Fudemoto et al. | |
| 2008/0009579 A1 | 1/2008 | Gong et al. | |
| 2008/0081866 A1 | 4/2008 | Gong et al. | |
| 2008/0145660 A1 | 6/2008 | Wang et al. | |
| 2008/0149238 A1 | 6/2008 | Kleckner et al. | |
| 2008/0160305 A1 | 7/2008 | Wang et al. | |

FOREIGN PATENT DOCUMENTS

| | | |
|---|---|---|
| DE | 4241538 | 6/1994 |
| EP | 0143500 | 6/1985 |
| EP | 0255170 | 2/1988 |
| EP | 0265142 | 4/1988 |
| EP | 0322905 | 7/1989 |
| EP | 0352042 | 1/1990 |
| EP | 0472344 | 2/1992 |
| EP | 0540942 | 5/1993 |
| EP | 0590491 | 4/1994 |
| EP | 0742268 | 11/1996 |
| EP | 1031605 | 8/2000 |
| EP | 1099728 | 5/2001 |
| EP | 1125927 | 8/2001 |
| EP | 1134251 | 9/2001 |
| EP | 1273616 | 6/2002 |
| EP | 1321489 | 6/2003 |
| JP | 1955517 | 8/1989 |
| JP | 01279943 | 11/1989 |
| JP | 05132605 | 5/1993 |
| JP | 06248017 | 9/1994 |
| JP | 08199062 | 8/1996 |
| JP | 3356001 | 10/2002 |
| JP | 2003-095640 | 4/2003 |
| WO | 91/04992 | 4/1991 |
| WO | 97/04029 | 2/1997 |
| WO | 98/53000 | 11/1998 |
| WO | 9942518 | 8/1999 |
| WO | WO 99/42518 * | 8/1999 |
| WO | 00/75226 | 12/2000 |
| WO | 01/87999 | 11/2001 |
| WO | 02/031002 | 4/2002 |
| WO | 02/081233 | 10/2002 |
| WO | 02/100936 | 12/2002 |
| WO | 03/085040 | 10/2003 |
| WO | 2004/058874 | 7/2004 |
| WO | 2005/095506 | 10/2005 |
| WO | 2006/069793 | 7/2006 |
| WO | 2007/149842 | 12/2007 |

OTHER PUBLICATIONS

Kralik, M. et al., "Catalysis by metal nanoparticles supported on functional organic polymers", Journal of Molecular Catalysis A: Chemical, vol. 177, pp. 113-138 [2001].

Akashi, Mitsuru et al., "Synthesis and Polymerization of a Styryl Terminated Oligovinylpyrrolidone Macromonomer", Die Angewandte Makromolekulare Chemie, 132, pp. 81-89 (1985).

Alexandridis, Paschalis et al., "Amphiphilic Block Copolymers: Self-Assembly and Applications", Elsevier Science B.V., pp. 1-435 (2000).

Allgaier, Jurgen et al., "Synthesis and Micellar Properties of PS-PI Block Copolymers of Different Architecture", ACS Polym. Prepr. (Div Polym. Chem.), vol. 37, No. 2, pp. 670-671 (1996).

Antonietti, Markus et al., "Determination of the Micelle Architecture of Polystyrene/Poly(4-vinylpyridine) Block Copolymers in Dilute Solution", Macromolecules, 27, pp. 3276-3281 (1994).

Antonietti, Markus et al., "Novel Amphiphilic Block Copolymers by Polymer Reactions and Their Use for Solubilization of Metal Salts and Metal Colloids", Macromolecules, 29, pp. 3800-3806 (1996).

Bahadur, Pratap, "Block copolymers- Their microdomain formation (in solid state) and surfactant behaviour (in solution)", Current Science, vol. 80, No. 8, pp. 1002-1007, Apr. 25, 2001.

Batzilla, Thomas et al., "Formation of intra- and intermolecular crosslinks in the radical crosslinking of poly(4-vinylstyrene)", Makromol. Chem., Rapid Commun. 8, pp. 261-268 (1987).

Bauer, B.J. et al., "Synthesis and Dilute-Solution Behavior of Model Star-Branched Polymers", Rubber Chemistry and Technology, vol. 51, pp. 406-436 (1978).

Berger, G. et al., "Mutual Termination of Anionic and Cationic 'Living' Polymers", Polymer Letters, vol. 4, pp. 183-186 (1966).

Borukhov, Itamar et al., "Enthalpic Stabilization of Brush-Coated Particles in a Polymer Melt", Macromolecules, vol. 35, pp. 5171-5182 (2002).

Bradley, John S., "The Chemistry of Transition Metal Colloids", Clusters and Colloids: From Theory to Applications, Chapter 6, Weinheim, VCH, pp. 459-544 (1994).

Braun, Hartmut et al., "Enthalpic interaction of diblock copolymers with immiscible polymer blend components", Polymer Bulletin, vol. 32, pp. 241-248 (1994).

Bronstein, Lyudmila M. et al., "Synthesis of Pd-, Pt-, and Rh-containing polymers derived from polystyrene-polybutadiene block copolymers; micellization of diblock copolymers due to complexation", Macromol. Chem. Phys., 199, pp. 1357-1363 (1998).

Brown, H.R. et al., "Communications to the Editor: Enthalpy-Driven Swelling of a Polymer Brush", Macromolecules, vol. 23, pp. 3383-3385 (1990).

Cahn, John W., "Phase Separation by Spinodal Decomposition in Isotropic Systems", The Journal of Chemical Physics, vol. 42, No. 1, pp. 93-99 (Jan. 1, 1965).

Calderara, Frederic et al., "Synthesis of chromophore-labelled polystyrene/poly(ethylene oxide) diblock copolymers", Makromol. Chem., 194, pp. 1411-1420 (1993).

Canham et al., "Formation of Worm-like Micelles from a Polystyrene-Polybutadiene-Polystyrene Block Copolymer in Ethyl Acetate", J.C.S. Faraday I, 76, pp. 1857-1867 (1980).

Chen, Ming-Qing et al., "Graft Copolymers Having Hydrophobic Backbone and Hydrophilic Branches. XXIII. Particle Size Control of Poly(ethylene glycol)- Coated Polystyrene Nanoparticles Prepared by Macromonomer Method", Journal of Polymer Science: Part A: Polymer Chemistry, vol. 37, pp. 2155-2166 (1999).

Chen, Ming-Qing et al., "Nanosphere Formation in Copolymerization of Methyl Methacrylate with Poly(ethylene glycol) Macromonomers", Journal of Polymer Science: Part A: Polymer Chemistry, vol. 38, pp. 1811-1817 (2000).

Chen, Wei et al., "Ultrahydrophobic and Ultrayophobic Surfaces: Some Comments and Examples", The ACS Journal of Surfaces and Colloids, vol. 15, No. 10, pp. 3395-3399 (May 11, 1999).

Coleman, Lester E. et al., "Reaction of Primary Aliphatic Amines with Maleic Anhydride", J. Org,. Chem., 24, 185, pp. 135-136 (1959).

Cosgrove, T . et al., Macromolecules, 26, pp. 4363-4367 (1993).

Coulson, S.R., et al., "Super-Repellent Composite Fluoropolymer Surfaces", The Journal of Physical Chemistry B, vol. 104, No. 37, pp. 8836-8840 (Sep. 21, 2000).

Dieterich, W. et al., "Non-Debye Relaxations in Disordered Ionic Solids", Chem. Chys., 284, pp. 439-467 (2002).

Ege, Seyhan, Orgnaic Chemistry Structures and Reactivity, 3rd Edition, p. 959 (1994).

Eisenberg, Adi, "Thermodynamics, Kinetics, and Mechanisms of the Formation of Multiple Block Copolymer Morphologies", Polymer Preprints, vol. 41, No. 2, pp. 1515-1516 (2000).

Erbil, H. Yildirim et al., "Transformation of a Simple Plastic into a Superhydrophobic Surface", Science, vol. 299, pp. 1377-1380 (Feb. 28, 2003).

Erhardt, Rainer et al., Macromolecules, vol. 34, No. 4, pp. 1069-1075 (2001).

Eschwey, Helmut et al., "Preparation and Some Properties of Star-Shaped Polymers with more than Hundred Side Chains", Die Makromolekulare Chemie 173, pp. 235-239 (1973).

Eschwey, Helmut et al., "Star polymers from styrene and divinylbenzene", Polymer, vol. 16, pp. 180-184 (Mar. 1975).

Fendler, Janos H., "Nanoparticles and Nanostructured Films: Preparation, Characterization and Applications", Wiley-VCH, pp. 1-468 (1998).

Ferreira, Paula G. et al., "Scaling Law for Entropic Effects at Interfaces between Grafter Layers and Polymers Melts", Macromolecules, vol. 31, pp. 3994-4003 (1998).

Garcia, Carlos B. et al., "Self-Assembly Approach toward Magnetic Silica-Type Nanoparticles of Different Shapes from Reverse Block Copolymer Mesophases", J. Am. Chem. Soc., vol. 125, pp. 13310-13311 (2003).

Gay, C., "Wetting of a Polymer Brush by a Chemically Identical Polymer Melt", Macromolecules, vol. 30, pp. 5959-5943 (1997).

Gilman, J.W. et al., "Recent Advances in Flame Retardant Polymer Nanocomposites", pp. 273-283.

Giannelis, E.P., "Polymer Layered Silicate Nanocomposites", Advanced Materials, vol. 8, No. 1, pp. 29-35 (Jan. 1, 1996).

Guo, Andrew et al., "Star Polymers and Nanospheres from Cross-Linkable Diblock Copolymers", Macromolecules, vol. 29, pp. 2487-2493, Jan. 17, 1996.

Halperin, A., "Polymeric Micelles: A Star Model", Macromolecules, vol. 20, pp. 2943-2946 (1987).

Hamley, Ian W., "The Physics of Block Copolymers", Oxford Science Publication: Oxford, Chapters 3 and 4, pp. 131-265, (1998).

Hardacre, C. et al., "Structure of molten 1,3-dimethylimidazolium chloride using neutron diffraction", J. Chem. Physics, 118(1), pp. 273-278 (2003).

Hasegawa, Ryuichi et al., "Optimum Graft Density for Dispersing Particles in Polymers Melts", Macromolecules, vol. 29, pp. 6656-6662 (1996).

Hay, J.N. et al., "A Review of Nanocomposites" (2002).

Hoffman, B. et al., "Rheology of Nanocomposites Based on Layered Silicates and Polyamide-12", Colloid Polm. Sci.., 278, pp. 629-636 (2000).

Ishizu, Koji et al., "Synthesis of Star Polymer with Nucleus of Microgel", Polymer Journal, vol. 12, No. 6, pp. 399-404 (1980).

Ishizu, Koji et al., "Core-Shell Type Polymer Microspheres Prepared from Block Copolymers", Journal of Polymer Science: Part C: Polymer Letters, vol. 26, pp. 281-286, 1988.

Ishizu, Koji, "Synthesis and Structural Ordering of Core-Shell Polymer Microspheres", Prog. Polym. Sci., vol. 23, pp. 1383-1408, 1998.

Ishizu, Koji, "Star Polymers by Immobilizing Functional Block Copolymers", Star and Hyperbranched Polymers, ISBN 0-8247, pp. 1986-1987 (1999).

Ishizu, Koji, "Structural Ordering of Core Crosslinked Nanoparticles and Architecture of Polymeric Superstructures", ACS Polym. Prepr. (Div Polym Chem) vol. 40, No. 1, pp. 456-457 (1999).

Jensen, M. et al., "EXAFS Investigations of the Mechanism of Facilitated Ion Transfer into a Room-Temperature Ionic Liquid", Jacs, 124, pp. 10664-10665 (2002).

Kim, Woo-Sik et al., "Synthesis and Photocrosslinking of Maleimide-Type Polymers", Macromol. Rapid Commun., 17, 835, pp. 835-841 (1996).

Kraus, Gerard, "Mechanical Losses in Carbon-Black-Filled Rubbers", Journal of Applied Polymer Science: Applied Polymer Symposium, vol. 39, pp. 75-92 (1984).

Krishnamoorti, R. et al., "Rheology of End-Tethered Polymer Layered Silicate Nanocomposite", Macromol., 30, pp. 4097-4102 (1997).

Lagaly, Gehard, "Kink-Block and Gauche-Block Structures of Bimolecular Films", Chem. Int. Ed. Eng., vol. 15, No. 10, pp. 575-586 (1976).

Lawson, David F. et al., "Preparation and Characterization of Heterophase Blends of Polycaprolactam and Hydrogenated Polydienes", Central Research Journal of Applied Polymer Science, vol. 39, pp. 2331-2351 (1990).

Lee, Wen-Fu et al., "Polysulfobetaines and Corresponding Cationic Polymers. IV. Synthesis and Aqueous Solution Properties of Cationic Poly (MIQSDMAPM)", J. Appl. Pol. Sci., vol. 59, pp. 599-608 (1996).

Ligoure, Christian, "Adhesion between a Polymer Brush and an Elastomer: A Self-Consistent Mean Field Model", Macromolecules, vol. 29, pp. 5459-5468 (1996).

Liu, Guojun et al., "Diblock Copolymer Nanofibers", Macromolecules, 29, pp. 5508-5510 (1996).

Liu, T. et al., "Formation of Amphiphilic Block Copolymer Micelles in Nanaqueous Solution", Amphiphilic Block Copolymers: Self-Assembly and Applications, Elsevier Science B.V., pp. 115-149 (2000).

Ma, H. et al., "Reverse Atom Transfer Radical Polymerization of Methyl Methacrylate in Room-Temperature Inoic Liqquids", J. Polym. Sci., A. Polym. Chem., 41, pp. 143-151 (2003).

Ma, Qinggao et al., "Entirely Hydrophilic Shell Cross-Linked Knedel-Like (SCK) Nanoparticles", Polymer Preprints, vol. 41, No. 2, pp. 1571-1572 (2000).

Matsen, M.W., "Phase Behavior of Block Copolymer/Hompolymer Blends", Macromolecules, vol. 28, pp. 5765-5773 (1995).

Mastumoto, A. et al., "Synthesis, Thermal Properties and Gas Permeability of Poly (N-n-alkylmaleimide)s", Polymer Journal, vol. 23, No. 3, pp. 201-209 (1991).

Mayer, A.B.R. et al., "Transition metal nanoparticles protected by amphiphilic block copolymers as tailored catalyst systems", Colloid Polym. Sci., 275, pp. 333-340 (1997).

Mendizabal, E. et al. "Functionalized Core-Shell Polymers Prepared by Microemulsion Polymerization", ANTEC 1997 Plastics: Plastics Saving Planet Earth, vol. 2: Materials Conference Proceedings, pp. 1733-1737.

Mi, Yongli et al., "Glass transition of nano-sized single chain globules", Polymer 43, Elsevier Science Ltd., pp. 6701-6705 (2002).

Milner, S.T. et al., "Theory of the Grafted Polymer Brush", Macromolecules, vol. 21, pp. 2610-2619 (1988).

Milner, S.T. et al., "End-Confined Polymers: Corrections to the Newtonian Limit", Macromolecules, vol. 22, pp. 489-490 (1989).

Moller, M. et al., Macromol. Symp., 117, pp. 207-218 (1997).

Nace, Vaughn M., "Nonionic Surfactants: Polyoxyalkylene Block Copolymers", Surfactant Science Series, vol. 60, pp. 1-266 (1996).

Newkome G.R, "Dendrimers and Dendrons, Concept, Synthesis, Application", pp. 45, 191-310 (2001).

Noolandi, Jaan et al., "Theory of Block Copolymer Micelles in Solution", Macromolecules, vol. 16, pp. 1443-1448 (1983).

Okay, Oguz et al., "Steric stabilization of reactive microgels from 1,4-divinylbenzene", Makromol. Chem., Rapid Commun., vol. 11, pp. 583-587 (1990).

Okay, Oguz et al., "Anionic Dispersion Polymerization of 1,4-Divinylbenzene", Macromolecules, 23, pp. 2623-2628 (1990).

Oranli, Levent et al., "Hydrodynamic studies on micellar solutions of styrene-butadiene block copolymers in selective solvents", Can. J. Chem., vol. 63, pp. 2691-2696, 1985.

Piirma, Irja, "Polymeric Surfactants", Surfactant Science Series, vol. 42, pp. 1-289 (1992).

Pispas, S. et al., "Effect of Architecture on the Micellization Properties of Block Copolymers: $A_2B$ Miktoarm Stars vs AB Diblocks", Macromolecules, vol. 33, pp. 1741-1746, Feb. 17, 2000.

Price, Colin, "Colloidal Properties of Block Copolymers", Applied Science Publishers Ltd., Chapter 2, pp. 39-80 (1982).

Quirk, R.P. et al., Macromolecules, 34, pp. 1192-1197 (2001).

Rager, Timo et al., "Micelle formation of poly(acrylic acid)- block-poly(methyl methacrylate) block copolymers in mixtures of water with organic solvents", Macromol. Chem. Phys., 200, No. 7, pp. 1672-1680 (1999).

Rein, David H. et al., "Kinetics of arm-first star polymers formation in a non-polar solvent", Macromol. Chem. Phys., vol. 199, pp. 569-574 (1998).

Rempp, Paul et al., "Grafting and Branching of Polymers", Pure Appl. Chem., vol. 30, pp. 229-238 (1972).

Ren, J., "Linear Viscoelasticity of Disordered Polystyrene-Polyisoprene . . . Layered-Silicate Nanocomposites", Macromol., pp. 3739-3746 (2000).

Riess, Gerard, "Micellization of block copolymers", Prog. Polym. Sci., vol. 28, pp. 1107-1110 (Jan. 16, 2003).

Saito, Reiko et al., "Synthesis of microspheres with 'hairy-ball' structures from poly (styrene-b-2-vinyl pyridine) diblock copolymers", Polymer, vol. 33, No. 5, pp. 1073-1077 (1992).

Saito, Reiko et al., "Synthesis of Microspheres with Microphase-Separated Shells", Journal of Polymer Science: Part A: Polymer Chemistry, vol. 38, pp. 2091-2097 (2000).

Semenov, A.N., "Theory of Diblock-Copolymer Segregation to the Interface and Free Surface of a Homopolymer Layer", Macromolecules, vol. 25, pp. 4967-4977 (1992).

Semenov, A.N., "Phase Equilibria in Block Copolymer-Homopolymer Mixtures", Macromolecules, vol. 26, pp. 2273-2281 (1993).

Serizawa, Takeshi et al., "Transmission Electron Microscopic Study of Cross-Sectional Morphologies of Core-Corona Polymeric Nanospheres", Macromolecules, 33, pp. 1759-1764 (2000).

Shull, Kenneth R., "End-Adsorbed Polymer Brushes in High- and Low-Molecular-Weight Matrices", Macromolecules, vol. 29, pp. 2659-2666 (1996).

Simmons, Blake et al., "Templating Nanostructure trhough the Self-Assembly of Surfactants", Synthesis, Functionalization and Surface Treatment of Nanoparticles, ASP (Am.Sci.Pub.), pp. 51-52, 174-208 (2003).

Stepanek, Miroslav et al. "Time-Dependent Behavior of Block Polyelectrolyte Micelles in Aqueous Media Studied by Potentiometric Titrations, QELS and Fluoroetry", Langmuir, Vo. 16, No. 6, pp. 2502-2507 (2000).

Thurmond II, K. Bruce et al., "Water-Soluble Knedel-like Structures: The Preparation of Shell-Cross-Linked Small Particles", J. Am. Chem. Soc., vol. 118, pp. 7239-7240 (1996).

Thurmond II, K. Bruce et al., "The Study of Shell Cross-Linked Knedels (SCK), Formation and Application", ACS Polym. Prepr. (Div Polym. Chem.), vol. 38, No. 1, pp. 62-63 (1997).

Thurmond, K. Bruce et al., "Shell cross-linked polymer micelles: stabilized assemblies with great versatility and potential", Colloids and Surfaces B: Biointerfaces, vol. 16, pp. 45-54 (1999).

Tiyapiboonchaiya, C. et la., "Polymer-m-Ionic-Liquid Electrolytes", Micromol. Chem. Phys., 203, pp. 1906-1911 (2002).

Tomalia, Donald A. et al., Dendritic Macromolecules: Synthesis of Starburst Dendrimers, , Macromolecules, vol. 19, No. 9, pp. 2466-2468 (1986).

Tistsilianis, Constantinos et al., Makromol. Chem. 191, pp. 2319-2328 (1990).

Tuzar et al ., "Anomalous Behaviour of Solutions of Styrene-Butadiene Block Copolymers in Some Solvents", Makromol. Chem. 178, pp. 22743-2746, (1977).

Tuzar, Zdenek et al., "Micelles of Block and Graft Copolymers in Solutions", Surface and Colloid Science, vol. 15, Chapter 1, pp. 1-83 (1993).

May 28, 2004 International Search Report from PCT Patent Application No. PCT/US03/40375 filed Dec. 18, 2003 (3 pp.).

Aug. 1, 2005 International Search Report from PCT Patent Application No. PCT/US2005/010352 filed Mar. 28, 2005 (3 pp.).

Dec. 27, 2007 International Search Report from PCT Patent Application No. PCT/US2007/071539 filed Jun. 19, 2007 (4 pp.).

Russell, G. , Feb. 22, 2006 International Preliminary Report on Patentability from PCT Patent Application No. PCT/US2005/010352 (7 pp.).

Ma, Yuhong et al., "Synthesis and Properties of the Ionomer Diblock Copolymer Poly(4-vinylbenzyl triethyl ammonium bromide)-b-Polyisobutene", Journal of Polymer Science: Part A: Chemistry, vol. 41, pp. 2755-2764 (2003).

Baranova, O.V. et al., "Effect of the Structure of Phase-Transfer Catalyst on the Rate of Alkaline Hydrolysis of N-Benzyloxycarbonylglycine 4-Nitrophenyl Ester in the System Chloroform-Borate Buffer", Russian Journal of Organic Chemistry, vol. 38, No. 3, pp. 400-406, XP002460082 (2002).

Wang, Yizhong et al., "Preparation and Characterization of Rubber-Clay Nanocomposites", Journal of Applied Polymer Science, vol. 78, pp. 1879-1883 (2000).

Webb, Paul B. et al., "Continuous Flow Hydroformylation of Alkenes in Supercritical Fluid-Ionic Liquid Biphasic Systems", Journal of American Chemistry Society, vol. 125, pp. 15577-15588 (2003).

* cited by examiner

NANO-COMPOSITE AND COMPOSITIONS THEREFROM

CROSS-REFERENCE TO RELATED APPLICATION

This application claims the benefit of priority from U.S. Provisional Application No. 60/649,420, filed on Feb. 2, 2005.

BACKGROUND OF THE INVENTION

The present invention generally relates to nano-composites and compositions including the nano-composite (also referred to as an organo-clay). More particularly, the present invention relates to a nano-composite comprising a cationic mediator and a clay, a polymer electrolyte composition comprising a cationic mediator and a solvent, a moisture reducing composition comprising a cationic mediator, the manufacture thereof, and industrial applications therefore.

Since the discovery of exfoliated nylon/clay nanocomposites by Usuki et al. (*J. Mater. Res.* 1993, 8, 1174), there have been extensive efforts to prepare various polymer-layered material composites. The most common morphology for miscible polymer-layered material dispersions is known as intercalation and exfoliation, which provides a polymer having improved mechanical, permeability, thermal, and heat distortion temperature properties. However, for polymers, particularly nonpolar polymers, well-exfoliated polymer-layered material nanocomposites are notoriously difficult to obtain.

Gas impermeability is an important characteristics for many polymer products, for example, butyl rubber. However, unsaturated bonds in butyl rubber, contributed by the presence of isoprene monomer units in the backbone, can be attacked by atmospheric ozone. These attacks may, over time, lead to oxidative degradation, which may subsequently lead to chain cleavage. As such, there exists a continuous interest in lowering gas permeability of polymers.

One technique for lowering gas permeability is using well-exfoliated layered materials as an additive. However, the effort to improve gas permeability must be balanced against damaging other polymer properties such as vulcanization plateau, Shore A hardness, cure capability, rubber damping properties, cure time, modulus, stress-strain, and moisture absorption, in order to achieve an overall superior performance. For example, although they reduce gas permeability, organo-clays derived from some organic ammonium salts of low decomposition temperature, may damage or retard the cure process of the rubber compound, especially, when using free radical cure, sulfur cure, ZnO cure and etc.

The present invention provides nano-composites based on a cationic mediator which is comprised of a polymeric group and a cationic unit selected from the group consisting of onium cation and heterocyclic cation. According to selected embodiments, the invention employs green solvents, e.g. 1-methylimidazol, as the reactants in preparing the cationic mediator, making both the process and product relatively environmentally friendly.

SUMMARY OF THE INVENTION

According to one embodiment, the present invention provides a nano-composite comprising (a) a cationic mediator comprised of a polymeric group and a cationic unit which is selected from the group consisting of onium cation and heterocyclic cation, and (b) a clay, wherein said polymeric group is covalently bonded to said cationic unit, and said clay is exfoliated by said cationic mediator.

Another embodiment of the invention provides a rubber and/or tire product, which includes the nano-composite.

Another embodiment of the invention provides a method of exfoliating a clay.

According to another embodiment, the invention provides a polymeric electrolyte composition, comprised of the cationic mediator and a solvent. The polymeric electrolyte composition can be used as battery membrane, etc.

According to another embodiment, the invention provides a moisture reducing composition comprising the cationic mediator.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention.

In the drawings appended hereto.

DETAILED DESCRIPTION OF THE INVENTION

Figure 1:
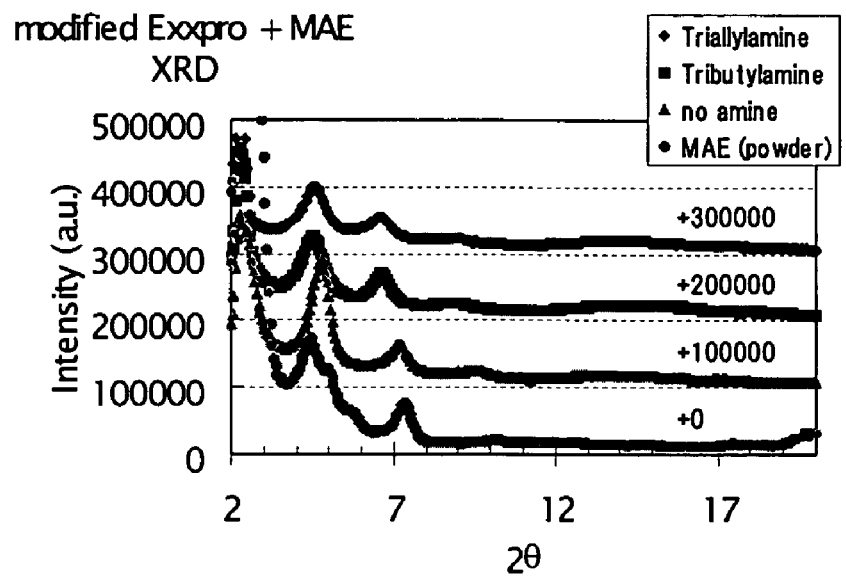
FIG. 1 shows the wide angle X-ray diffractions (XRD) of four samples in one embodiment of the invention. The four samples are MAE powder, MAE treated Exxpro rubber (no amine), MAE treated Exxpro rubber modified with triallyl amine, and MAE treated Exxpro rubber modified with tributyl amine.

The term "cationic mediator" is used in the present invention to define a chemical species able to effectively mediate, or compatibilize, an immiscible organic polymer and an inorganic layered material such as clay, into a relatively homogenous mixture which lacks significant phase separation. One exemplary form of "mediation" is to facilitate the intercalation or exfoliation of organic polymer in between the layers of the layered material.

The cationic mediator comprises at least one cationic unit, i.e. hydrophilic part, that can bind to the layers of the inorganic layered material with effectively higher affinity than with an organic, and typically also hydrophobic, material, such as butyl rubber. While typically a cationic mediator binds to an inorganic layered material by hydrophilic interaction or ionic bond, it can also bind or link to an organic material through a variety of physical and chemical forces such as hydrophobic interaction, covalent bonds, $\pi$-$\pi$ stacking interaction, lock-key type interaction, hydrogen bonds, and coordination bonds etc. Accordingly, a cationic mediator of the present invention structurally also comprises, in addition to the "at least one cationic unit", a polymeric group, examples of which include an organic binding unit, or a sufficiently long alkyl chain, etc.

The cationic unit, monoatomic or polyatomic, bears one or more elementary proton charges, i.e. positive charges. Depending upon the specific structure of a cationic mediator, such as the presence or absence of a conjugated system, the positive charge(s) can be either localized or delocalized. The cationic mediator is accompanied by negatively charged species to balance its positive charge and neutralize the overall charge of the system. Although the negatively charged species is typically independent, e.g. counter ion(s), it is also within the scope of the present invention that the negatively charged species is part of the cationic mediator, by which an inner salt is formed. In various embodiments of the present invention, the counter ions of the cationic mediators may also be those negatively charged groups of the layered material, for example, after the cationic mediators have exchanged some cations of the layered material by intercalating between the layers of the clay.

Exemplary counter ions of the cationic mediator include, but are not limited to, simple anions such as $Cl^-$, $Br^-$, $F^-$, $I^-$, $O^{2-}$, $S^{2-}$, $Se^{2-}$, $Te^{2-}$, $N^{3-}$, $As^{3-}$, and the like; and polyatomic anions such as $BF_4^-$, $PF_6^-$, $CO_3^{2-}$, $HCO_3^-$, $SO_4^{2-}$, $CF_3SO_3^-$, $SO_3^{2-}$, $S_2O_3^{2-}$, $HSO_4^-$, $H_2PO_4^-$, $HPO_4^{2-}$, $PO_4^{3-}$, $NO_2^-$, $NO_3^-$, $C_2O_4^{2-}$, $C_2H_3O_2^-$, $OH^-$, $O_2^{2-}$, $N_3^-$, $CrO_4^{2-}$, $Cr_2O_7^{2-}$, $BO_3^{3-}$, $MnO_4^-$, $AsO_4^{3-}$, $SCN^-$, $CN^-$, $CNO^-$, $ClO^-$, $ClO_2^-$, $ClO_3^-$, $ClO_4^-$, $BrO^-$, $BrO_2^-$, $BrO_3^-$, $BrO_4^-$, $IO^-$, $IO_2^-$, $IO_3^-$, $IO_4^-$, and the like.

According to one embodiment, the present invention provides a nano-composite comprising (a) a cationic mediator comprised of a polymeric group and a cationic unit which is selected from the group consisting of onium cation and heterocyclic cation, and (b) an exfoliated clay, wherein said polymeric group is covalently bonded to said cationic unit.

Although the cationic unit in the mediator may be one or more of organometallic cations such as $Fe^{3+}$, $Fe^{2+}$, $Co^{2+}$, $Zn^{2+}$, $Ni^{2+}$, $Cu^{2+}$, $Al^{3+}$, $Ga^{3+}$, $Mg^{2+}$ and the like, a preferred cationic unit is one or more onium cations such as ammonium, oxonium, fluoronium, phosphonium, sulfonium, chloronium, arsonium, selenonium, bromonium, stibonium, telluronium, iodonium, and bismuthonium having the general formulas (I) to (XIV) shown below:

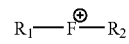 (I)

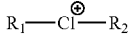 (II)

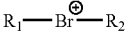 (III)

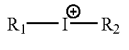 (IV)

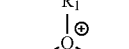 (V)

 (VI)

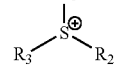 (VII)

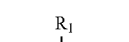 (VIII)

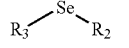 (IX)

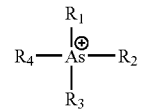 (X)

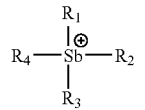 (XI)

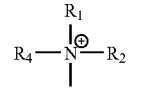 (XII)

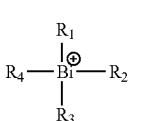 (XIII)

in which $R_1$, $R_2$, $R_3$, and $R_4$ can be independently any suitable univalent (i.e. having a valence of one) groups.

It is also within the scope of the invention that two or more of the $R_1$, $R_2$, $R_3$, and $R_4$ groups are replaced by a group having two or more free valencies on the same atom, for example, hydrocarbylidyne oxonium, iminium, nitrilium etc.

The heterocyclic cations include, but are not limited to, imidazolium, 1-alkylimidazolium, 1,3-dialkylimidazolium, 1-arylalkylimidazolium, 1-arylalky-3-alkyl-limidazolium, 1,3-diarylalkylimidazolium, benzimidazolium, imidazolinium, pyridinium, piperidinium, pyrazinium, piperazinium, pyrrolium, pyrrolidinium, pyrazolium, diazolium, triazolium, pyridazinium, tetrazolium, amidinium, guanidinium, oxazolium, oxadiazolium, oxatriazolium, thiazolium, thiadiazolium, thiatriazolium, quaternary pyrazolidine, quaternary pyrrolidones, indolium, isoindolium, quinolinium, isoquinolinium, quinazolinium, quinoxalinium, derivates thereof, and mixtures thereof.

Taking imidazolium to exemplify the meaning of derivatives, the cationic unit can have the formula (XIV) as shown below.

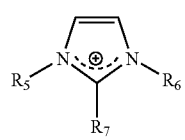 (XIV)

In formulas (I) to (XIV), each of the $R_1$, $R_2$, $R_3$, $R_4$, $R_5$, $R_6$, and $R_7$ groups can independently be hydrogen; a saturated or unsaturated, substituted or unsubstituted, straight or branched, cyclic or acyclic $C_1$-$C_{50}$ alkyl group; a substituted or unsubstituted aryl-containing or hetaryl-containing group; and the like.

Specific examples of $R_1$, $R_2$, $R_3$, $R_4$, $R_5$, $R_6$, and $R_7$ groups include, but are not limited to, hydrogen, methyl, ethyl, vinyl, allyl, propyl, isopropyl, butyl, isobutyl, behenyl, palmitoleyl, oleyl, linoleyl, linelenyl, erucyl, capryl, tallow, n-pentyl, any isopentyl, n-hexyl, any isohexyl, n-heptyl, any isoheptyl, n-octyl, any isooctyl, n-nonyl, any isononyl, n-decyl, any isodecyl, n-undecyl, any isoundecyl, n-dodecyl or lauryl, any isododecyl, n-tridecyl, any isotridecyl, n-tetradecyl, myristyl, any isotetradecyl, n-pentadecyl, any isopentadecyl, n-hexadecyl or cetyl, palmityl, any isohexadecyl, n-heptadecyl, any isoheptadecyl, n-octadecyl, stearyl, any isooctadecyl, n-nonadecyl, any isononadecyl, n-eicosyl, any isoeicosyl, n-henicosyl, any isohenicosyl, n-docosyl, any isodocosyl, n-tricosyl, any isotricosyl, n-tetracosyl, any isotetracosyl, n-pentacosyl, any isopentacosyl, n-hexacosyl, any isohexacosyl, n-heptacosyl, any isoheptacosyl, n-octacosyl, any isooctacosyl, n-nonacosyl, any isononacosyl, n-triacontyl, any isotriacontyl, n-hentriacontyl, any isohentriacontyl, n-dotriacontyl, any isodotriacontyl, n-tritriacontyl, any isotritriacontyl, n-tetratriacontyl, any isotetratriacontyl, n-pentatriacontyl, any isopentatriacontyl, n-hexatriacontyl, any isohexatriacontyl, n-heptatriacontyl, any isoheptatriacontyl, n-octatriacontyl, any isooctatriacontyl, n-nonatriacontyl, any isononatriacontyl, n-tetracontyl, any isotetracontyl, n-hentetracontyl, any isohentetracontyl, n-dotetracontyl, any isodotetracontyl, n-tritetracontyl, any isotritetracontyl, n-tetratetracontyl, any isotetratetracontyl, n-pentatetracontyl, any isopentatetracontyl, n-hexatetracontyl, any isohexatetracontyl, n-heptatetracontyl, any isoheptatetracontyl, n-octatetracontyl, any isooctatetracontyl, n-nonatetracontyl, any isononatetracontyl, n-pentacontyl, any isopentacontyl, and the like.

In formulas (I) to (XIV), $R_1$, $R_2$, $R_3$, $R_4$, $R_5$, $R_6$, and $R_7$ can also independently of each other be aryl-containing or hetaryl-containing groups. As used herein, the terms "aryl" and "hetaryl" are intended to embrace monocyclic or polycyclic aromatic hydrocarbon and heterocyclic groups. Examples of aralkyl and alkylaralkyl groups include, but are not limited to, benzyl, benzhydryl, tolylmethyl, trityl, cinnamyl, phenethyl, styryl, phenylbutyl, neophyl, and the like. Examples of aryl and alkylaryl groups include, but are not limited to, phenyl, biphenyl, tolyl, xylyl, mesityl, cumenyl, di(t-butyl)phenyl, anthryl, indenyl, naphthyl, and the like. Haloaryl and haloaralkyl groups are aryl and aralkyl groups which have been substituted with one or more halo groups. Examples of such groups include, but are not limited to, halobenzyl (e.g., fluorobenzyl, chlorobenzyl, bromobenzyl, or iodobenzyl, whether ortho-, meta-, or para-substituted), dihalobenzyl, trihalobenzyl, tetrahalobenzyl, pentahalobenzyl, halophenyl (e.g., fluorophenyl, chlorophenyl, bromophenyl, or iodophenyl, whether ortho-, meta-, or para-substituted), dihalophenyl, trihalophenyl, tetrahalophenyl, and pentahalophenyl.

Specific examples of other aryl-containing and hetaryl-containing $R_1$, $R_2$, $R_3$, $R_4$, $R_5$, $R_6$, and $R_7$ groups include phenoxy, tolyloxy, xylyloxy, mesityloxy, and cumenyloxy; biphenyl, anilino, toluidino, tosyl, allyl-benzyl or -phenyl, furyl, pyridyl, 2-pyridyl (pyridin-2-yl), indol-1-yl, chloromethyl-benzyl or -phenyl, trifluoromethyl-benzyl or -phenyl, hydroxy-benzyl or -phenyl, methoxy-benzyl or -phenyl, ethoxy-benzyl or -phenyl, methoxyethoxy-benzyl or -phenyl, allyloxy-benzyl or -phenyl, phenoxy-benzyl or -phenyl, acetoxy-benzyl or -phenyl, benzoyloxy-benzyl or -phenyl, methylthio-benzyl or -phenyl, phenylthio-benzyl or -phenyl, tolylthio-benzyl or -phenyl, methylamino-benzyl or -phenyl, dimethylamino-benzyl or -phenyl, ethylamino-benzyl or -phenyl, diethylamino-benzyl or -phenyl, acetylamino-benzyl or -phenyl, carboxy-benzyl or -phenyl, methoxycarbonyl-benzyl or -phenyl, ethoxycarbonyl-benzyl or -phenyl, phenoxycarbonyl-benzyl or -phenyl, chlorophenoxycarbonyl-benzyl or -phenyl, N-cyclohexylcarbamoyloxy-benzyl or -phenyl, allyloxycarbonyl-benzyl or -phenyl, carbamoyl-benzyl or -phenyl, N-methylcarbamoyl-benzyl or -phenyl, N,N-dipropylcarbamoyl-benzyl or -phenyl, N-phenylcarbamoyl-benzyl or -phenyl, nitro-benzyl or -phenyl, cyano-benzyl or -phenyl, sulfo-benzyl or -phenyl, sulfonato-benzyl or -phenyl, phosphono-benzyl or -phenyl, phosphonato-benzyl or -phenyl groups, and morpholino-benzyl or -phenyl and the like.

Cationic unit(s) in the mediator may also cover any suitable and sufficiently stable ylium ions or carbocations such as carbenium, bis(ylium), tris(ylium), alkylium, carbonium such as di- or tri-arylcarbonium, vinyl cations, allyl cation, sulfanylium, germylium, furan-2-ylium, acylium, sulfonylium, and the like.

There is no specific limitation to the polymeric group in the cationic mediator. However, preferred polymeric groups include polymers that can facilitate intercalation or exfoliation between clay layers more effectively with than without the aid of the cationic unit as demonstrated above. Conveniently defined by its backbone structure, the polymeric group can have a saturated or unsaturated polyvinyl-type (i.e., carbon-chain) backbone, such as polychloroprene, polyethylene, isobutene-isoprene rubber (butyl rubber, IIR), halogenated butyl rubber (HIIR) such as ClIIR and BrIIR, neoprene rubber, nitrile rubber (NBR), 1,2-polybutadiene, polyallene, polybutadiene (butadiene rubber, BR), polyisobutylene (PIB), polyisoprene, 3,4-polyisoprene, poly(methyl acrylate), poly(methyl vinyl ketone), ethylene-propylene elastomer, polystyrene (PS), polyacrylamide, poly(acrylamide oxime), polypropylene (PP), styrene-butadiene rubber (SBR), poly(methyl methacrylate), acrylonitrile-butadiene-styrene terpolymer (ABS), poly(vinyl chloride) (PVC), poly(vinylidene chloride), poly(vinyl pyridine), poly(vinyl pyrrolidone), poly(acrylic anhydride), polyacrylonitrile, Exxpro™ elastomers (brominated isobutylene p-methylstyrene copolymer, Exxon Chemical, TX, USA), styrene-acrylonitrile copolymer (SAN), ethylene-vinyl acetate copolymer (EVA) and the like, and mixtures thereof.

The polymeric group can also possess a backbone with one or more functional groups such as carbonyl, or a non-carbon element such as N, S or O etc. (i.e. heterochain polymer). Exemplary heterochain polymers include, but are not limited to, polyether such as poly(oxyethylene), polyformaldehyde, poly(phenylene oxide) or polyacetaldehyde; polyacrolein, polysulfide, polysulfone, poly(alkylene polysulfide), polyester, polycarbonate, polyphosphate ester, polyamide, polyurea, polyurethane, heterocyclic polymer, polyhydrazides, polyimide, melamine-formaldehyde resin (MF), polysaccharides, phenol-formaldehyde resin (PF), polyanhydride etc., and mixtures thereof.

More specific polymer examples are illustrated in the following scheme, in which n, x, y, and z are all integral numbers:

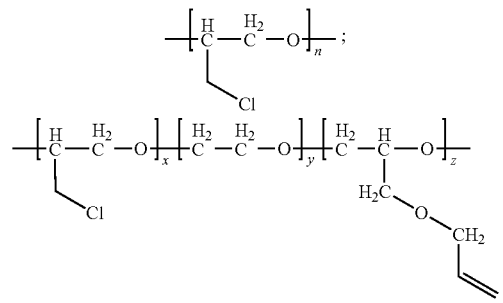

-continued

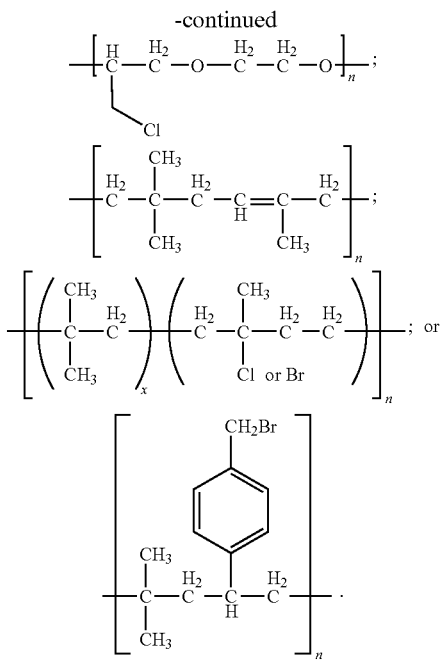

Moreover, the polymeric group of the present invention can be inorganic or inorganic/organic polymer such as polysiloxane, polysilane, carborane polymer, and organometallic polymer etc.

The invention provides a nano-composite comprising (a) a cationic mediator comprised of a polymeric group and a cationic unit which is selected from the group consisting of onium cation and heterocyclic cation, and (b) a clay, wherein said polymeric group is covalently bonded to said cationic unit, and said clay is exfoliated by said cationic mediator. Since the polymeric group is covalently bonded to one or more of the cationic units, one or more coupling groups can be formed between the polymeric group and cationic units. The coupling groups, optionally together with the polymeric group, may sometimes be viewed as one of the $R_1$, $R_2$, $R_3$, $R_4$, $R_5$, $R_6$, and $R_7$ groups, which are also contemplated to be within the scope of the present invention. Illustrative examples include:

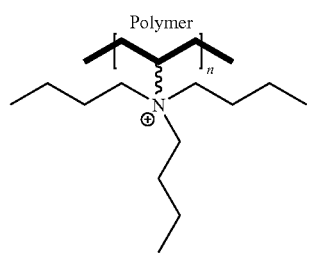
(XVIII)

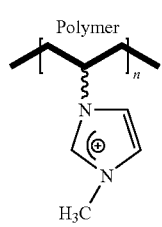
(XIV)

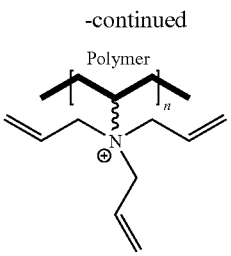
(XX)

The architecture of the polymeric group can be linear, branched, or networked, a centipede polymer, a comb polymer, a star polymer, a ladder polymer, or a dendrimer and so on. When the polymeric group is a copolymer, it can be block copolymer, graft copolymer, statistical copolymer, random copolymer, periodic copolymer, and alternating copolymer etc. Likewise, terpolymers, tetrapolymers and so on, are also within the scope of the polymers of the present invention. Generally, the molecular weight of the polymer can be between 300 and 300,000,000, preferably between 1,000 and 100,000,000, more preferably between 5,000 and 10,000,000.

In the case exemplified in formulas (XVIII), (XIV), and (XX), the polymeric group connects to the cationic unit(s) via one or more covalent bonds (coupling groups). One end of the coupling group can connect to any suitable position in the polymeric group backbone, while the other end can connect to any suitable position in the cationic unit(s). Exemplary coupling groups include, but are not limited to, linear or branched ($C_1$-$C_6$)alkylene such as methylene, ethylene, and propylene, and linear or branched ($C_1$-$C_6$)oxyalkylene etc. The stereochemistry, due to the pendant cationic unit(s), of the polymeric group can be isotactic, syndiotactic, or atactic. However, it should be understood that, merely for nomenclature purpose, the coupling group, entirely or partially, can be named as part of the cationic unit(s), or part of the polymeric group. For example, the cationic mediator of the following structure can be described as 1-methylimidazolium with a methylene coupling group to the polymeric group, or a 1,3-dimethylimidazolium with a direct covalent bond to the polymeric group.

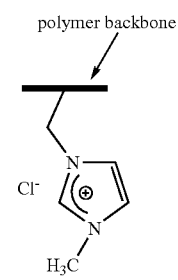

Optionally, the nano-composite of the present invention may further mix with another polymer such as butyl rubber. Advantageously, butyl rubber can also exfoliate the clay. To this end, in the cationic mediator, at least one of $R_1$, $R_2$, $R_3$, $R_4$ groups for any of formula (I-XIII) onium cations, or at least one of $R_5$, $R_6$, and $R_7$ groups for formula (XIV) heterocyclic cation, or at least part of the polymeric group, should preferably be of such length or size (e.g. having a carbon chain with at least four carbon atoms, at least eight carbon atoms, or at least 16 carbon atoms) to have sufficient hydrophobicity and be able to effectively bind with butyl rubber, and facilitate the co-intercalation or co-exfoliation of the butyl rubber in between clay layers.

Optionally, the cationic mediator of the present invention may be combined with other cationic mediators or surfactants, in exfoliating clay and forming the nano-composite of the present invention. Examples of the "other types of cationic mediator" may be dimethyl ditallow ammonium, trimethyl tallow ammonium, dimethyl dihydrogenated tallow ammonium, methyl ethyl ditallow ammonium, methyl ethyl benzyl tallow ammonium, dimethyl ethyl tallow ammonium, and some heterocyclic cations as indicated below.

The cationic mediator and the clay of the present invention are either commercially available, or can be prepared using synthetic techniques that are known to a person skilled in the art. For example, a brominated isobutylene p-methylstyrene copolymer can be obtained from Exxon Chemicals under the trade name of Exxpro 3745. Dimethylditallow ammonium treated mica and synthetic mica can be obtained from Coop Chemicals (Tokyo, Japan) under the trade name of MAE and ME-100, respectively. According to one embodiment, a cationic mediator comprised of a polyether group and an 1-methylimidazolium cation is produced by condensing a halogen-containing polymer such as polyepichlorohydrin with

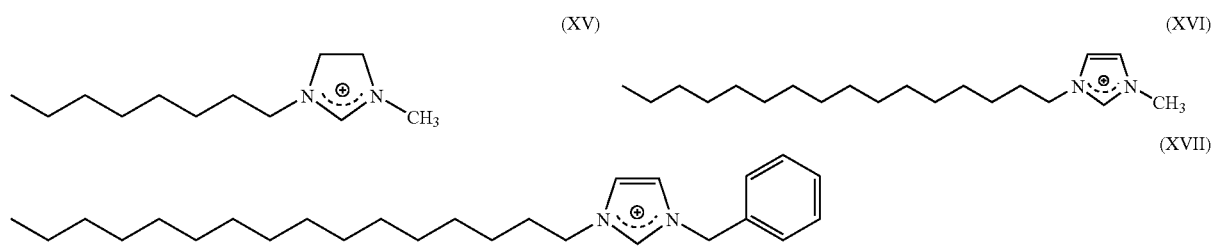

"Layered material" means an inorganic material that is in the form of a plurality of adjacent bound layers or plates. Layered materials used are those that can give at least one of the cationic mediators access to their interlayer spaces through exchanging, partially or completely, their cations with cationic mediators, a process called intercalation or exfoliation. Intercalated layered materials may retain order or uniformity in layer spacing and/or layer position. In one embodiment, the layered material is first intercalated, and then exfoliated. The cationic mediator to facilitate intercalation or exfoliation may be accompanied along with one or more polymers by connecting the polymer(s) through a variety of forces, for example, hydrophobic interaction, π-π stacking interaction, lock-key type interaction, hydrogen bonds, coordination bonds, covalent bonds, and combinations thereof. Under the influence of the cationic mediator, the polymer(s) can also intercalate in between, or compatiblize with, or exfoliate, or delaminate the layers of the layered material. In many cases, the layered material is clay, which typically comprises an inorganic phase having layered materials in plates or other shapes with a significantly high aspect ratio. The aspect ratio is defined as the ratio of the largest and smallest dimension of the clay particles.

Exemplary clays include, but are not limited to, synthetic mica; smectites such as montmorillonite (Bentonite), sodium montmorillonite, magnesium montmorillonite, calcium montmorillonite, beidellite, nontronite, hectorite, sodium hectorite, saponite, synthetic saponite, and sauconite; pyrophyllite; glauconites; vermiculites; polygorskines; sepiolites; allophanes; imogolites; talc; mica; fluoro-mica; illites; glauconite; phyllosilicates; volkonskoite; sobockite; stevensite; svinfordite; magadiite; kenyaite; kaolinite; dickite; nacrite; anauxite; ledikite; montronite; silicate; halloysite; metahalloysite; sericite; allophone; serpentine clays; chrysotile; antigorite; attapulgite; sepiolite; palygorskite; Kibushi clay; gairome clay; hisingerite; chlorite; and mixtures thereof.

Typical clays have a layered structure with a gap of about 0.1 nm between each layer and cations such as $K^+$ and $Na^+$ on the surface of each layer. The cations are attached by an ionic interaction with the negatively charged surface of the clay layers, and create a net neutral charge between clay layers.

1-methylimidazole at elevated temperature, preferably up to 70° C., more preferably up to 100° C., and most preferably up to 150° C. In this reaction, the reactant 1-methylimidazole is one example of room temperature ionic liquids which are commonly considered as a green solvent for chemical synthesis. It should be understood that, due to the accessibility of the polyepichlorohydrin chloro-group to the 1-methylimidazole, not necessarily all of the chloro-groups are converted to 1-methylimidazolium. Preferably, the conversion is at least 50%, more preferably at least 80%, and most preferably at least 95%. Without being bound by theory, the reaction is believed to occur in a mechanism as illustrated below.

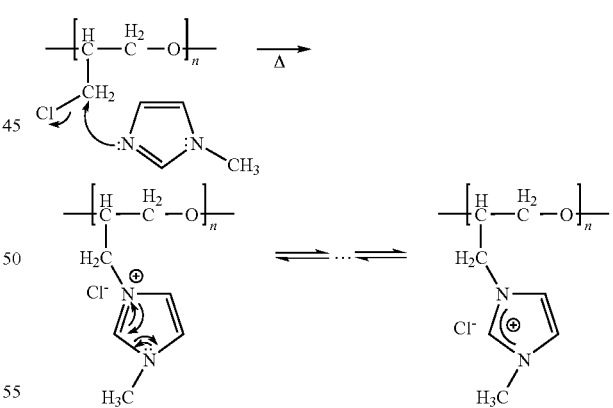

In one embodiment, a cationic mediator comprised of a butyl rubber group and ammonium is produced by reacting a solid state polymer, such as brominated butyl rubber, chlorinated butyl rubber or Exxpro, with suitable amine compounds, such as tributylamine or triallylamine. The reaction product can then be directly mixed with a clay or an organo-clay to prepare nano-composites of the present invention. The benefit of this embodiment is that, among others, the process does not need treatment of the clay using polymer surfactants in solution and is therefore efficient and cost-effective.

In various embodiments, the cationic mediator may be used to exfoliate a clay and form useful products such as a nano-composite, or organo-clay, or exfoliated clay. An exfoliated layered material does not retain the degree of order or uniformity in layer spacing and/or position that may be found in layered materials or intercalated layered materials. In the present invention, the ratio between clay and cationic mediator can be from 5:95 to 95:5 by weight, preferably from 30:70 to 70:30 by weight, and more preferably from 40:60 to 60:40. Preferably, the exfoliated clay will have an average between-layer gap greater than about 1 nm, and more preferably a gap greater than about 3.0 nm.

In the exfoliation procedure, optionally a clay may be first swelled by placing it in water. Swelling takes place because the cations of the clay become solubilized in the water, leaving adjacent negatively charged clay layers. The adjacent clay layers are repulsed by their similar negative charges, resulting in gaps. A cationic mediator may then be added to the swollen clay to form an organo-clay or the nano-composite. Alternatively, before addition of the cationic mediator, the clay may be pre-exfoliated with some cationic surfactants such as ammonium salts. Still alternatively, if a cationic mediator per se can exist as an ionic liquid during the exfoliation procedure, a clay may be directly mixed with the cationic mediator. The cationic mediator is attracted to the negatively charged surface of the clay, keeping the swelling state stable and forming gaps of at least about 5-10 nm between the layers. If additional non-polar polymer such as rubber is added to the clay/cationic mediator nano-composite, it can further separate the layers of the clay, because the added polymer and the cationic mediator can attract each other at, e.g., their hydrophobic portions, and the added polymer will penetrate between clay layers. The large molecule size of the cationic mediator and/or the added polymer can counteract any remaining Van der Waals interactions between the clay layers and the clay can be fully exfoliated, i.e. separated into discrete layers.

The nano-composite of present invention may be utilized in various applications, for example, rubber formulation and tire production, because the effective exfoliation of clays helps to improve gas permeability and other physical properties of rubber. In one embodiment of the invention, an organo-clay is dispersed into a rubber such as butyl rubber. Optionally, preferably prior to dispersing the organo-clay in the rubber, the organo-clay may be washed and dried. Preferably, the organo-clay is washed with an alcohol, such as, but not limited to, isopropanol, water or mixtures thereof. According to the present invention, the rubber so formulated has lower gas permeability without a negative impact on the cure properties.

In a rubber formulation, additional stabilizers, antioxidants, conventional fillers, processing aids, accelerators, extenders, curing agents, reinforcing agents, reinforcing resins, pigments, fragrances, and the like can optionally be added. Specific examples of useful antioxidants and stabilizers include 2-(2'-hydroxy-5'-methylphenyl)benzotriazole, nickel di-butyl-di-thiocarbamate, tris(nonylphenyl) phosphite, 2,6-di-t-butyl-4-methylphenol, and the like. Exemplary fillers include silica, carbon black, titanium dioxide, iron oxide, and the like. Suitable reinforcing materials are inorganic or organic products of high molecular weight. Examples include glass fibers, asbestos, boron fibers, carbon and graphite fibers, whiskers, quartz and silica fibers, ceramic fibers, metal fibers, natural organic fibers, and synthetic organic fibers.

As one exemplary benefit of the present invention, good cure properties and low gas permeability can both be achieved for some rubber formulations. Exemplary rubbers suitable to the present invention include, but are not limited to, butyl rubber, BR, Hcis BR, SBR, NR and so on. As used herein, the butyl rubber may include isobutylene, halobutyl rubber, and copolymers of isobutylene and one or more additional monomers, such as isoprene, styrene, butadiene, and mixtures thereof. The butyl rubber composition is useful in the formation of inner liners for automobile tires and in applications requiring good damping characteristics, such as engine mounts. Other uses for the butyl rubber include use in air cushions, pneumatic springs, air bellows, accumulator bags, tire-curing bladders, high temperature service hoses, and conveyor belts for handling hot materials.

The nano-composite of the present invention can be advantageously incorporated into butyl rubber by any method known to a skilled artisan, for example, wet/solvent method or a dry mixing method under mild mixing conditions. Such mild mixing conditions are, for example, similar to those normally used in butyl rubber mixing. The mixing may be accomplished, for example, by using any integral mixing device such as a Brabender mixer, a twinscrew extruder or a kneader, at a mixing rate of from about 20 to about 200 rpm, at a temperature of about 25° C. to about 250° C. for a period of about 3-30 minutes. In one embodiment, the mixing conditions are for example, mixing in a Brabender mixer at about 60 rpm at a temperature of about 70° C. for about three minutes. Of course, the organo-clay can be added according to any other method known by the skilled artisan. It is preferred that between about 1 and about 70%, more preferably, between about 3 and about 40% by weight of organo-clay or nano-composite is incorporated into the butyl rubber. Preferably, the clay in the final product is at least about 50% exfoliated, more preferably at least about 70% exfoliated. The degree of exfoliation may be found using an image created by transmission electron microscopy (TEM). The image includes black areas representing clay particles. Imaging analysis software may be used to determine the degree of exfoliation as the ratio of the population of the black areas that have a thickness of less than about 5 nm to the total population of black areas.

In the following, the invention will be described in more detail with reference to non-limiting examples. The following examples and tables are presented for purposes of illustration only and are not to be construed in a limiting sense.

EXAMPLES

Organo-clays or clays have been treated with solid reactive rubbers to form nano-composites. The solid reactive rubbers were prepared by reacting brominated butyl rubber, chlorinated butyl rubber or Exxpro with amines. Clays were exfoliated by one-step process, i.e. mixing clays or organo-clays with the reactive rubber, and the process does not need complicated processes containing the treatment using polymer surfactants in solution.

Example 1

To a 50 g Brabender mixer, 45 g of Exxpro 3745 (from Exxon chemical) and 2.1 g of tributylamine were added. The mixture was allowed to react at 100° C. for 4 minutes. In the same time the mixture was agitated at speed of 60 rpm. The whole process was protected by nitrogen purging.

Example 2

The process of example 1 was repeated with minor change of the materials used. In this example, to the 50 g Brabender mixture were charged 45 g of Exxpro 3745 and 1.5 g of triallylamine.

Example 3

38.4 g of the product from example 1 was mixed with MAE (from Coop Chemical Corp.) in the Brabender mixer at 60 rpm, 100° C. for 3 minutes, wherein MAE is dimethylditallow ammonium treated mica. After the stock was cooled to room temperature, the stock was added to the Brabender again. The remill process was taken at 60 rpm, 100° C. for 3 minutes.

Example 4

The process of example 3 was repeated with minor change of the material used. 38.4 g of the product from example 2 was mixed with MAE.

Example 5

38.4 g of Exxpro 3745 was mixed with MAE in the Brabender mixer at 60 rpm, 100° C. for 3 minutes. The stock was cooled to room temperature. The stock was added to the Brabender again. The remill process was taken at 60 rpm 100° C. for 3 minutes.

Example 6

Figure 2:
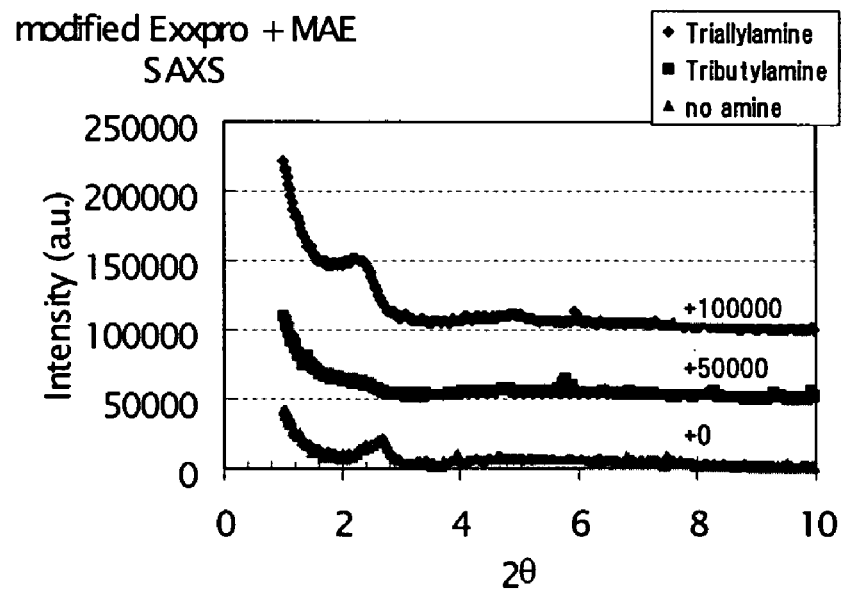
FIG. 2 shows the small angle X-ray scatterings (SAXS) of three samples in one embodiment of the invention. The three samples are MAE treated Exxpro rubber, MAE treated Exxpro rubber modified with triallylamine, and MAE treated Exxpro rubber modified with tributylamine.

Neat MAE powder and products from Examples 3, 4 and 5 were then examined using wide angle X-ray diffraction (XRD) and small angle X-ray scattering (SAXS) at 50 kV and 200 mA power. XRD and SAXS results in FIGS. 1 and 2 indicated that the new materials and the new treatment improved the exfoliation of MAE.

Example 7

A nitrogen purged Brabender mixer (~60 g capacity) equipped with roller blades was initially set to 60 rpm and 75° C. The mixer was then charged with 30 g of Hydrin H75 from ZEON Chemicals in Tokyo, Japan. After 1 minute, 26.6 g of 1-methylimidazole (from Aldrich) was slowly added into the mixer, at about 5 g/min. Then, the agitation speed was adjusted to 20 rpm and the heating element was set to an isothermal condition. After 22 hours, the material in the mixer became very viscous and the temperature was adjusted to 100° C. After 1 hour, the heating element was turned off and the polymer was allowed to cool down. The polymer was removed from the mixer at 23° C.

Example 8

A nitrogen purged Brabender mixer (~60 g capacity) equipped with roller blades was initially set to 60 rpm and 75° C. The mixer was then charged with 35 g of Hydrin H75 from ZEON Chemicals in Tokyo, Japan. After 1 minute, 26.6 g of 1-methylimidazole (from Aldrich) was slowly added into the mixer, at about 5 g/min. Then, the agitation speed was adjusted to 20 rpm and the heating element was set to be isothermal condition. After 21 hours, the polymer was removed from the mixer.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

What is claimed is:

1. A nano-composite comprising
   (a) a cationic mediator comprised of a polymeric group and a cationic unit which is selected from the group consisting of onium cation and heterocyclic cation, and
   (b) a clay,
   wherein said polymeric group is covalently bonded to said cationic unit, and said clay is exfoliated by said cationic mediator;
   wherein the polymeric group comprises a polyether or a butyl rubber and the cationic mediator has one of the formulas as shown below:

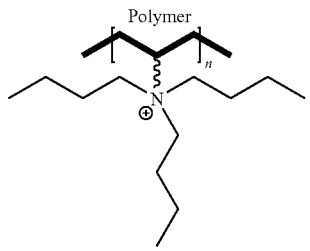

(XVIII)

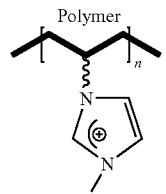

(XIV)

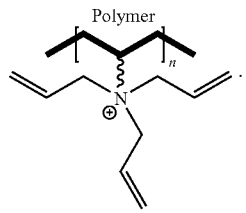

(XX)

2. The nano-composite of claim 1, further comprising a counter ion selected from the group consisting of $Cl^-$, $Br^-$, $F^-$, $I^-$, $O^{2-}$, $S^{2-}$, $Se^{2-}$, $Te^{2-}$, $N^{3-}$, $As^{3-}$, $BF_4^-$, $PF_6^-$, $CO_3^{2-}$, $HCO_3^-$, $SO_4^{2-}$, $CF_3SO_3^-$, $SO_3^{2-}$, $S_2O_3^{2-}$, $HSO_4^-$, $H_2PO_4^-$, $HPO_4^{2-}$, $PO_4^-$, $NO_2^-$, $NO_3^-$, $C_2O_4^{2-}$, $C_2H_3O_2^-$, $OH^-$, $O_2^{2-}$, $N_3^-$, $CrO_4^{2-}$, $Cr_2O_7^{2-}$, $BO_3^{3-}$, $MnO_4^-$, $AsO_4^{3-}$, $SCN^-$, $CN^-$, $CNO^-$, $ClO^-$, $ClO_2^-$, $ClO_3^-$, $ClO_4^-$, $BrO^-$, $BrO_2^-$, $BrO_3^-$, $BrO_4^-$, $IO^-$, $IO_2^-$, $IO_3^-$, and $IO_4^-$.

3. The nano-composite of claim 1, in which the clay is selected from the group consisting of mica; fluoro-mica; synthetic mica; smectites, montmorillonite (Bentonite), sodium montmorillonite, magnesium montmorillonite, calcium montmorillonite, beidellite, nontronite, hectorite, sodium hectorite, saponite, synthetic saponite, sauconite; pyrophyllite; glauconites; vermiculites; polygorskines; sepiolites; allophanes; imogolites; talc; illites; glauconite; phyllosilicates; volkonskoite; sobockite; stevensite; svinfordite; magadiite; kenyaite; kaolinite; dickite; nacrite; anauxite; ledikite; montronite; silicate; halloysite; metahalloysite; sericite; allophone; serpentine clays; chrysotile; antigorite; attapulgite; sepiolite; palygorskite; Kibushi clay; gairome clay; hisingerite; chlorite; and mixtures thereof.

4. A rubber formulation, comprising the nano-composite of claim 1.

5. A tire product, comprising the nano-composite of claim 1.

6. A method of exfoliating a clay comprising
combining a clay and a sufficient amount of a cationic mediator having a polymeric group;
wherein the polymeric group comprises a polyether or a butyl rubber and the cationic mediator has one of the formulas as shown below:

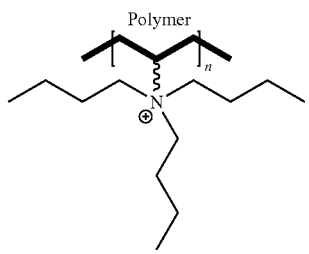
(XVIII)

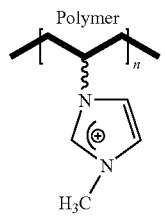
(XIV)

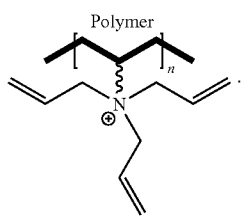
(XX)

7. A method of improving rubber gas permeability comprising
combining a clay and a sufficient amount of a cationic mediator having a polymeric group to at least partially exfoliate the clay; and
combining the exfoliated clay with a rubber;
wherein the polymeric group comprises a polyether or a butyl rubber and the cationic mediator has one of the formulas as shown below:

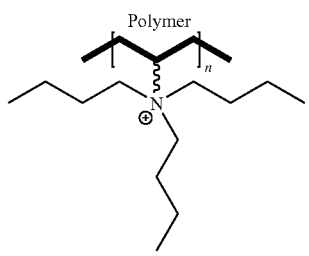
(XVIII)

-continued

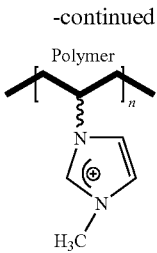
(XIV)

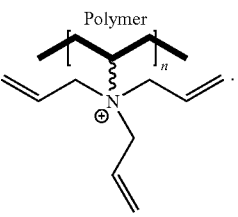
(XX)

8. The nano-composite of claim 1, wherein at least one between-layer gap in said exfoliated clay comprises an average of at least 1 nm.

9. The nano-composite of claim 1 wherein said at least one between-layer gap comprises an average of at least 3 nm.

10. The nano-composite of claim 1 wherein the butyl rubber is halogenated butyl rubber.

11. The nano-composite of claim 1 wherein the polyether is polyepichlorohydrin.

12. The method of claim 7 wherein the butyl rubber is halogenated butyl rubber.

13. The method of claim 7 wherein the polyether is polyepichlorohydrin.

14. The method of claim 7 wherein the clay and the cationic mediator having a polymeric group are combined in the substantial absence of solvent or surfactant.

15. The method of claim 7 further comprising forming a tire product from the combined rubber and exfoliated clay.

16. The method of claim 7 wherein the cationic mediator further comprises a counter ion selected from the group consisting of $Cl^-$, $Br^-$, $F^-$, $I^-$, $O^{2-}$, $S^{2-}$, $Se^{2-}$, $Te^{2-}$, $N^{3-}$, $As^{3-}$, $BF_4^-$, $PF_6^-$, $CO_3^{2-}$, $HCO_3^-$, $SO_4^{2-}$, $CF_3SO_3^-$, $SO_3^{2-}$, $S_2O_3^{2-}$, $HSO_4^-$, $H_2PO_4^-$, $HPO_4^{2-}$, $PO_4^{3-}$, $NO_2^-$, $NO_3^-$, $C_2O_4^{2-}$, $C_2H_3O_2^-$, $OH^-$, $O_2^{2-}$, $N_3^-$, $CrO_4^{2-}$, $Cr_2O_7^{2-}$, $BO_3^{3-}$, $MnO_4^-$, $AsO_4^{3-}$, $SCN^-$, $CN^-$, $CNO^-$, $ClO^-$, $ClO_2^-$, $ClO_3^-$, $ClO_4^-$, $BrO^-$, $BrO_2^-$, $BrO_3^-$, $BrO_4^-$, $IO^-$, $IO_2^-$, $IO_3^-$, and $IO_4^-$.

17. The method of claim 6 wherein the butyl rubber is halogenated butyl rubber.

18. The method of claim 6 wherein the polyether is polyepichlorohydrin.

19. The method of claim 6 wherein the clay and the cationic mediator having a polymeric group are combined in the substantial absence of solvent or surfactant.

20. The method of claim 6 further comprising forming a tire product from the combined rubber and exfoliated clay.

* * * * *

UNITED STATES PATENT AND TRADEMARK OFFICE
CERTIFICATE OF CORRECTION

PATENT NO. : 7,579,398 B2
APPLICATION NO. : 11/344861
DATED : August 25, 2009
INVENTOR(S) : Fudemoto et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 716 days.

Signed and Sealed this

Fourteenth Day of September, 2010

David J. Kappos
*Director of the United States Patent and Trademark Office*